(12) United States Patent
Panchamgam

(10) Patent No.: US 10,417,606 B2
(45) Date of Patent: Sep. 17, 2019

(54) DISPLAY SPACE OPTIMIZATION

(71) Applicant: ORACLE INTERNATIONAL CORPORATION, Redwood Shores, CA (US)

(72) Inventor: Kiran V. Panchamgam, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 367 days.

(21) Appl. No.: 14/709,702

(22) Filed: May 12, 2015

(65) Prior Publication Data

US 2016/0335586 A1 Nov. 17, 2016

(51) Int. Cl.
G06Q 30/00 (2012.01)
A47F 1/00 (2006.01)
A47F 5/00 (2006.01)
G06Q 10/08 (2012.01)

(52) U.S. Cl.
CPC .................................. G06Q 10/087 (2013.01)

(58) Field of Classification Search
CPC .......... G06Q 10/087; G06Q 30/00; A47F 5/00
USPC .......................................... 705/28, 7.31, 22
See application file for complete search history.

(56) References Cited

U.S. PATENT DOCUMENTS 5,608,621 A * 3/1997 Caveney .......... G06Q 10/06315
705/28
7,287,001 B1 * 10/2007 Falls ................... G06Q 10/087
235/383
2003/0200129 A1 * 10/2003 Klaubauf ......... G06Q 10/06315
705/7.25
2008/0147475 A1 * 6/2008 Gruttadauria ........ G06Q 10/087
705/7.31
2008/0208719 A1 * 8/2008 Sharma .................. G06Q 10/00
705/29
2011/0276364 A1 * 11/2011 Bergstrom ............. G06Q 10/04
705/7.29

(Continued)

OTHER PUBLICATIONS

Kok et al.; Demand Estimation and Assortment Optimization Under Substitution: Methodology and Application; Operations Research, vol. 55, No. 6, Nov.-Dec. 2007; pp. 1001-1021.

Primary Examiner — Luna Champagne
(74) Attorney, Agent, or Firm — Kraguljac Law Group, LLC

(57) ABSTRACT

Systems, methods, and other embodiments associated with assortment and display space optimization are described. In one embodiment, a method creates an optimal planogram. The example method includes receiving data describing i) a set of items described by item dimensions, ii) display space dimensions; iii) business rules, and iv) a key performance indicator. A set of possible shelf positions is identified for each item. An expected sales volume is calculated for each item and shelf position pair based, at least in part, on a selected demand model. The method includes providing i) the expected sales volume for the item and shelf position pairs, ii) a set of constraints that embody the business rules, and iii) an objective function to an optimization problem solver that computes a solution. Based on the solution, a planogram is output that specifies the assortment of items and respective optimal shelf positions of the items.

19 Claims, 9 Drawing Sheets

(56) References Cited

U.S. PATENT DOCUMENTS

| | | | |
|---|---|---|---|
| 2011/0315645 A1* | 12/2011 | Fadrowski | A47F 5/02 211/59.2 |
| 2012/0022913 A1* | 1/2012 | Volkmann | G06Q 10/087 705/7.29 |
| 2013/0132241 A1* | 5/2013 | Sorensen | G06Q 10/087 705/28 |
| 2013/0275277 A1 | 10/2013 | Mihic et al. | |
| 2014/0358633 A1 | 12/2014 | Wu et al. | |

* cited by examiner

DISPLAY SPACE OPTIMIZATION

BACKGROUND

Assortment and shelf space optimization is a common business problem for retailers. A retailer must select, from a corpus of all available products, an assortment of those products to carry and display. The retailer must also decide, for each product in the assortment, a shelf on which to display the item and how to orient the item on the shelf. With thousands of products available and limited display space, finding an optimal assortment and arrangement of the assortment becomes an intractable problem.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
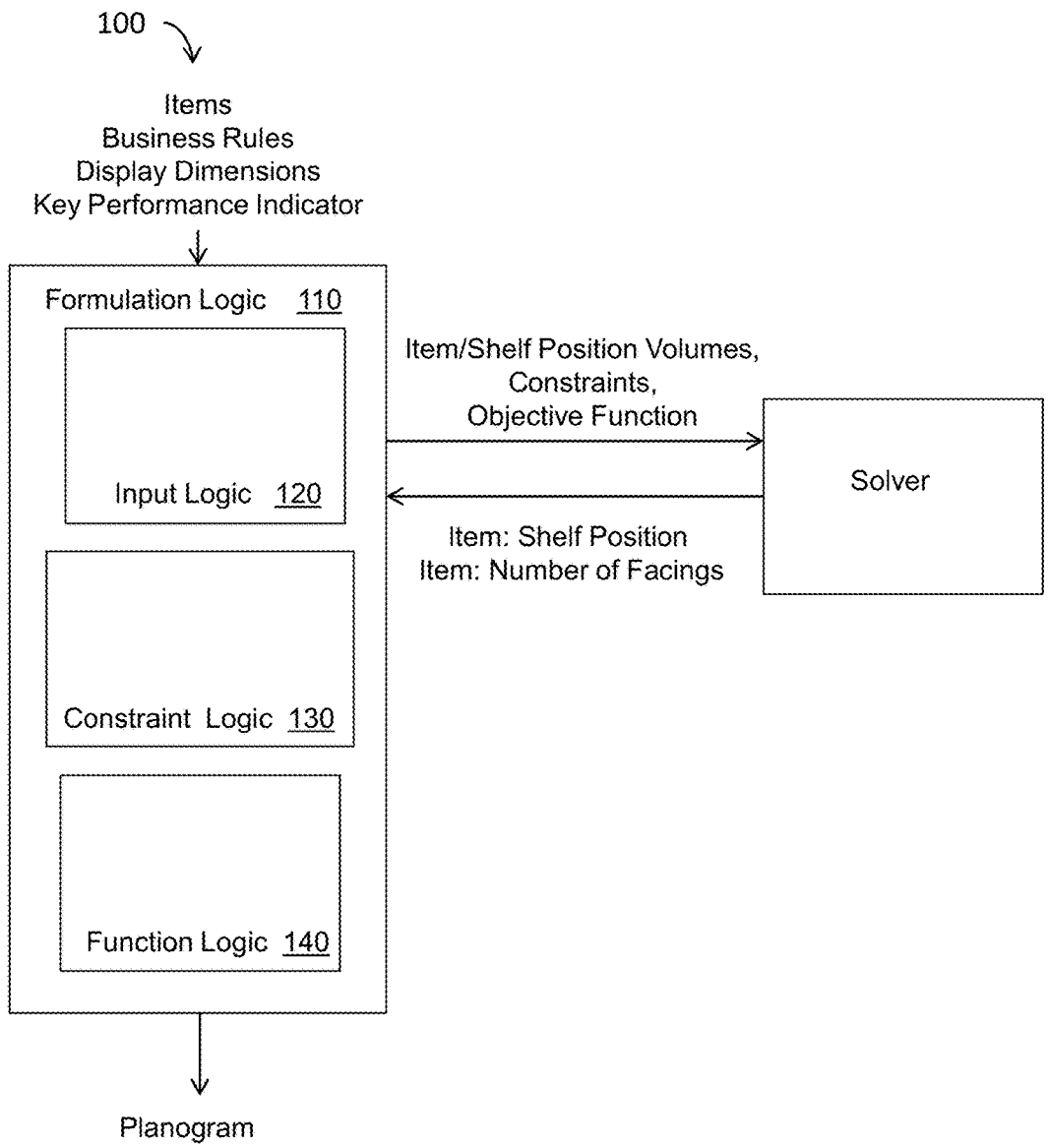
FIG. 1 illustrates one embodiment of a system associated with display space optimization.

The assortment and shelf space optimization problem is faced by retailers every day. Retailers seek to select and arrange items in a manner that optimizes some key performance indicator such as revenue maximization, sales volume maximization, profit maximization, or minimization of on-hand inventory. Many factors impact how effectively a particular arrangement of items in a display space achieves the retailer's particular goals. One factor is the number of facings that each item has. A facing is defined as the displayed portion of the item for the customer. Depending on the orientation of the item on the shelf, the item can have different numbers of facings. For example, in the same length of shelving a box of cereal oriented with its side facing the aisle may have five facings while the box of cereal oriented with its front facing the aisle may have three facings. The number of facings an item is given is known to impact the demand for the item, which in turn affects whether a particular arrangement of items realizes the retailer's goals.

Product geometry as well as business rules constrain the possible arrangements of items within the display space. Certain items are designed to be stacked or nested. Heavy or large items should be placed on bottom shelves. Business rules may specify that popular brands are supposed to be positioned at eye level. Retailers usually follow a set of visual guidelines or blocking constraints. Blocking constraints control how related items are arranged in either a primarily horizontal or vertical fashion. For example, with primarily vertical blocking, the items are displayed so that the customer sees products separated into vertical blocks by some attribute, such as brand. This makes it easier for a customer to find all products for a given brand, since they are placed together in the display space. A retailer may separate the products within each vertical block into several horizontal blocks based on another attribute, such as size.

Retailers typically generate a planogram for each item category using naïve techniques. A planogram specifies which items are placed on which shelf and how many facings are given to each item. Not only does the retailer have to adhere to all the business rules and item geometry constraints, but also find a planogram that optimizes the retailer's desired key performance indicator. It is no trivial task to design such a planogram, as a typical grocer may have to decide among thousands of items and honor many business rules at the same time.

Systems and methods are described herein that provide pre-processing and formulation of an assortment and shelf space optimization problem that can be input to an optimization problem solver solution to produce an optimal planogram. The systems and method described herein interact with a solver solution to produce a planogram that maximizes a retailer's selected key performance indicator (e.g., profit) while honoring the retailer's business rules. Like many real-world optimization problems, assortment and shelf space optimization can be formulated as maximizing a nonlinear function of discrete variables subject to certain constraints involving some nonlinear functions of its arguments. In one embodiment, the described systems and methods provide an efficient and effective Mixed Integer Programming based solution. While the systems and methods described herein will be described in the context of the assortment and shelf space optimization field, the systems and methods are also applicable to other optimization problems with similar structure.

With reference to FIG. 1, one embodiment of a system 100 associated with assortment and shelf space optimization is illustrated. The system 100 includes formulation logic 110 that formulates an optimization problem that captures a retailer's item geometries, display space dimensions, business rules, and key performance indicator. One example optimization problem formulation is summarized in Appendix A. The formulated optimization problem is input to a solver that outputs a solution, when feasible. In one embodiment, the solver is an off-the-shelf Mixed Integer Linear Programming based optimization problem solving solution. The solver's solution, which is a set of item and shelf positions within the display space that meets the constraints and optimizes an objective function that embodies the key performance indicator, is converted to a planogram and output by the system 100. The set of items that is selected for inclusion in the planogram is called the "assortment" which is a subset of items that were input to the solver for consideration.

The formulation logic 110 receives data corresponding to a corpus of items, business rules, display dimensions, and a key performance indicator. This data may be received from a retailer seeking a planogram for a category of items. The data may be stored in a data structure that is accessed by the formulation logic 110 or otherwise transmitted to the formulation logic 110. The item data describes a corpus of items (e.g., an entire line of products produced by a supplier) from which an assortment of items will be selected for the planogram. The data for an item includes data describing the item's dimensions and may also include data describing how the particular item may be displayed (e.g., stacked, nested, and so on). The display space is conceptualized by the formulation logic 110 as a set of shelves having either fixed or variable height, as will be described in more detail below.

The business rule data includes data that specifies rules or constraints for individual items. The business rules may also assign items to different groups of items that must meet certain rules. For example, a certain item may be designated as mandatory, meaning that any assortment must include the item. The mandatory designation is used by retailers for popular or iconic items (e.g., Coca-Cola® cans or Pepsi® cans) that must be on display in the store, regardless of their impact on the key performance indicator (e.g., profits or losses). A minimum capacity may be specified for an item. The minimum capacity sets a minimum capacity for the item that must be maintained in the planogram. The planogram's capacity for an item depends on the orientation, number of facings, and dimensions of the display space allocated to the item. An elevation range may be specified for an item. The elevation range constrains placement of the item to a certain range of elevations in the display space (e.g., eye level for increased visibility).

Another common business constraint on items is service level. Service level is the probability that a customer will find at least one of an item on the shelf. It is known that customers expect certain items, like milk and bread, to always be available at a store such that the customers may decided to shop elsewhere after finding these items out of stock at a store. Retailers assign high service levels to these items that customers expect to see. Retailers are willing to stock higher quantities of these items necessary to provide the desired service level regardless of the impact on profits and losses. The business constraints include service levels for each item in the corpus, which may or may not be considered when the planogram is constructed as will be described in more detail below.

The business rules may also assign selected items to item groups. Retailers use item groups in many ways. In one embodiment, the formulation logic 110 is configured to recognize four different types of group constraints on a group items selected from a set of related items. A group may be required to have at i) least n items, ii) exactly n items, iii) at most n items, or iv) either all items in the group or none of the items in the group (an "all or nothing group"). A retailer may know that customers will be unsatisfied if they do not see at least the three most popular flavors of ice cream in the freezer. In this case, the retailer can assign ice cream gallons to a group that is required to have at least three items. A retailer may know that customers will typically only buy a certain brand of shampoo if the conditioner is also available. In this case the retailer can assign the shampoo item and the conditioner item to an all or nothing group so that shampoo will not be selected for the planogram assortment if conditioner is not also selected.

Match facings groups may also be described by business rules. In a match facing group, each item in the set must have exactly the same number of facings. For example, a retailer may specify a match facing group for oatmeal flavors when she wants to have an equal number of facings for each flavor of oatmeal. Another type of group constraint is the same shelf constraint. In a same shelf group, the items in the group must be assigned to the same shelf. This type of constraint may be used place small size items like spices all together on a shelf so that the customer can easily compare the items and select an item.

An important constraint that is embodied in the business rules that are received by the formulation logic 110 is the retailer's blocking strategy. The blocking strategy defines visual guidelines for placement of items that are related in some attribute in either vertical or horizontal blocks on the shelves for the convenience of the customer. For example, in a vertical blocking strategy on brand and size and given a first brand of cereal having three sizes and two other brands of cereal having only one size, five vertical blocks would be created, one for each brand/size combination.

There are two components to a blocking strategy: primary blocking strategy and secondary blocking strategy. There are two possible choices of blocking strategy: primary vertical and secondary horizontal or primary horizontal and secondary vertical. In one embodiment, one or more of the business rules received by the formulation logic 110 define the retailer's selected blocking strategy. In constructing the business rules, the retailer can pick a variety of item attributes for defining either primary or secondary blocking strategies for the item. Thus, the retailer can use a combination of attributes to create a vertical block or a horizontal block.

For example, for a cereal item a retailer may select primary blocking as vertical and secondary blocking as horizontal. For this strategy, vertical blocks are created in the display space for each combination of attributes and within each vertical block, horizontal sub-blocks are created. If the primary attribute is brand and the secondary attribute is flavor, a vertical block will be created for each cereal brand, say Post® and General Mills®. Within each vertical block, a horizontal sub-block will be created for each flavor so that the Post® vertical block will have a row of fiber cereal, a row of oat cereal, and a row of fruit flavored cereal, and so on. Likewise, the General Mills® vertical block will have a row of fiber cereal, a row of oat cereal, and a row of fruit flavored cereal, and so on. A customer will find all the Post® cereals in a vertical block and all the General Mills® cereals in a different vertical block.

If the retailer had selected primary blocking as horizontal and secondary blocking as vertical the display space would be arranged differently. A horizontal block would be created for each cereal brand and within each horizontal block, a vertical sub-block would be created for each flavor so that the Post® horizontal block would have a column of fiber cereal, a column of oat cereal, and a column of fruit flavored cereal, and so on. Likewise, the General Mills® horizontal block would have a column of fiber cereal, a column of oat cereal, and a column of fruit flavored cereal, and so on. A customer would find all the Post® cereals in a horizontal block and all the General Mills® cereals in a different horizontal block. It can be seen that the blocking strategy greatly increases the complexity of the planogram selection process. However, by limiting the number of item and shelf combinations and formulating a linear objective function that approximates the non-linear aspects of demand the blocking strategy can be considered and imposed on the planogram that is produced by the formulation logic 110.

The formulation logic 110 includes input logic 120, constraint logic 130, and function logic 140. The input logic 120 calculates a set of inputs that will be input to the solver as part of the problem formulation. The inputs to the solver include expected sales volumes for item and shelf position pairs. Each item and shelf position pair corresponds to a particular item in a particular shelf position. Thus, each item may be a member of several item and shelf position pairs. The input logic 120 performs pre-processing that eliminates many potential item and shelf position pairs to create an input set of item and shelf position pairs that meets some initial constraints. The input logic 120 calculates a predicted sales volume for each item and shelf position pair which is not eliminated. As will be described in more detail with reference to FIG. 8, in some embodiments, the input logic 120 also calculates an expected service level for each item and shelf position pair, which is a second input to the solver. By limiting the set of item and shelf position pair volumes and service levels that are input to the solver, the input logic 120 simplifies the optimization process, making it more likely that a feasible solution can be found.

The constraint logic 130 interprets the business rules that were input to the formulation logic 110 to produce corresponding constraints. The constraint logic 130 may select a subset of constraints from a stored set of constraints that are mapped to the business rules received by the formulation logic 110 or may itself generate constraints from the business rules. The constraints produced by the constraint logic 130 may be used by the input logic 120 to filter the set of inputs to the solver (e.g., identify possible shelf positions for items). Some or all of the constraints are provided, as part of an optimization problem formulation, to the solver so that the solver may consider the constraints when determining an optimal solution.

As will be described in more detail below with reference to FIG. 6, the function logic 140 compiles an objective function based on the key performance indicator received by the formulation logic 110. In one embodiment, the objective function casts the key performance indicator as a function of the demand transference for each item not selected for the assortment as well as the shelf contribution for each item in the assortment. The objective function is provided to the solver such that the solver will select item and shelf position pairs that maximize the objective function while obeying the constraints from the constraint logic 130.

In one embodiment, the system 100 is a computing/data processing system including an application or collection of distributed applications for enterprise organizations. The applications and system 100 may be configured to operate with or be implemented as a cloud-based networking system, a software as a service (SaaS) architecture, or other type of networked computing solution. In one embodiment the system 100 is a centralized server-side application that provides at least the functions disclosed herein and that is accessed by many users via computing devices/terminals communicating with the computing system 100 (functioning as the server) over a computer network.

Figure 2:
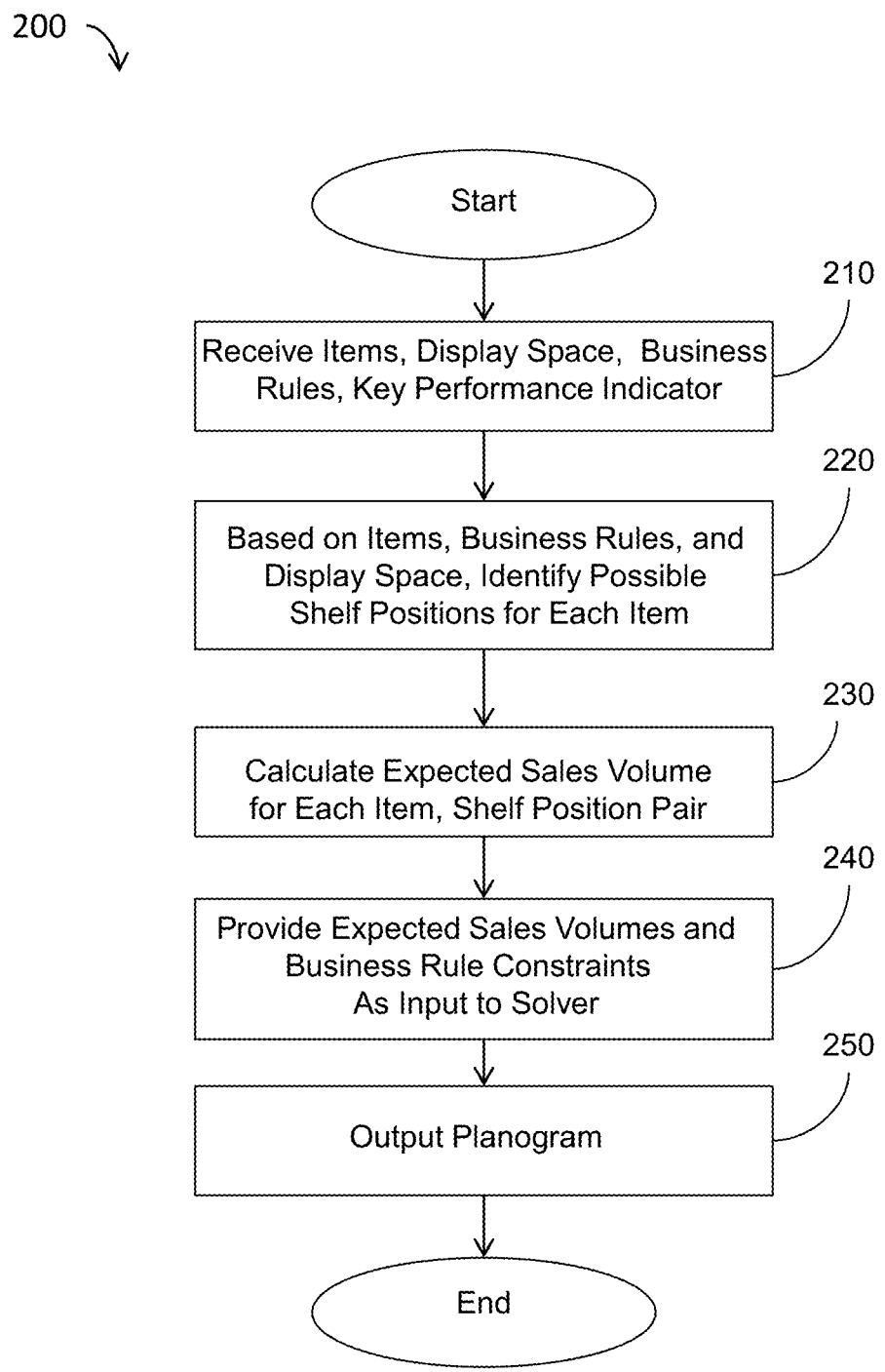
FIG. 2 illustrates an embodiment of a method performed by the system of FIG. 1 to optimize an assortment within a display space.

FIG. 2 illustrates one embodiment of a method 200 associated with assortment and shelf space optimization that may be performed by the formulation logic 110 of FIG. 1. The method includes, at 210 receiving data describing i) a set of items selected from a corpus of items, where each item is described by item dimensions, ii) display space dimensions; iii) business rules that constrain the selection and positioning of items in the display space, and iv) a key performance indicator. The data may be received from a user interacting with a computer display or by accessing a data structure that has been populated with item data for the corpus of items and/or user selections for a given item category.

At 220, based, at least in part, on the item dimensions and a first subset of the business rules, a set of possible shelf positions in the display space is identified for each item in the set. The set of possible shelf positions for a given item may be determined by comparing the item's geometry to the dimensions of shelves in the display space to determine if the item will fit on the shelf. Shelf positions for an item that would violate a business rule may be eliminated, for example, if a shelf position places the item above or below a prescribed display height range for the item. Item and shelf position pairs are created by combining each item with each of its possible shelf positions.

At 230, an expected sales volume for each item and available shelf position pair is calculated based on a selected demand model. In one embodiment, the demand model predicts the expected sales volume for each item and shelf position pair based on i) a quantity of item facings produced by positioning the item in the shelf position and ii) a demand transference from items in the corpus that are not included in the set of items. In one embodiment, a service level for each item and shelf position pair is also calculated based on the selected demand model.

At 240, an optimization problem formulation is provided to an optimization problem solver. The problem formulation includes i) the expected sales volume, and optionally the service level, for the item and shelf position pairs, ii) the display space dimensions, iii) one or more constraints that embody the business rules, and iv) an objective function that expresses the key performance indicator as a function of the sales volume and, optionally, service level. An example problem formulation is set forth in Appendix A. The optimization problem solver, constrained by the constraints computes a solution that specifies an assortment of the items and, for each item in the assortment, an optimal shelf position, such that the objective function is maximized. At 250, a planogram is output that specifies the assortment of items and respective optimal shelf positions of the items calculated by the solver.

Figure 3:
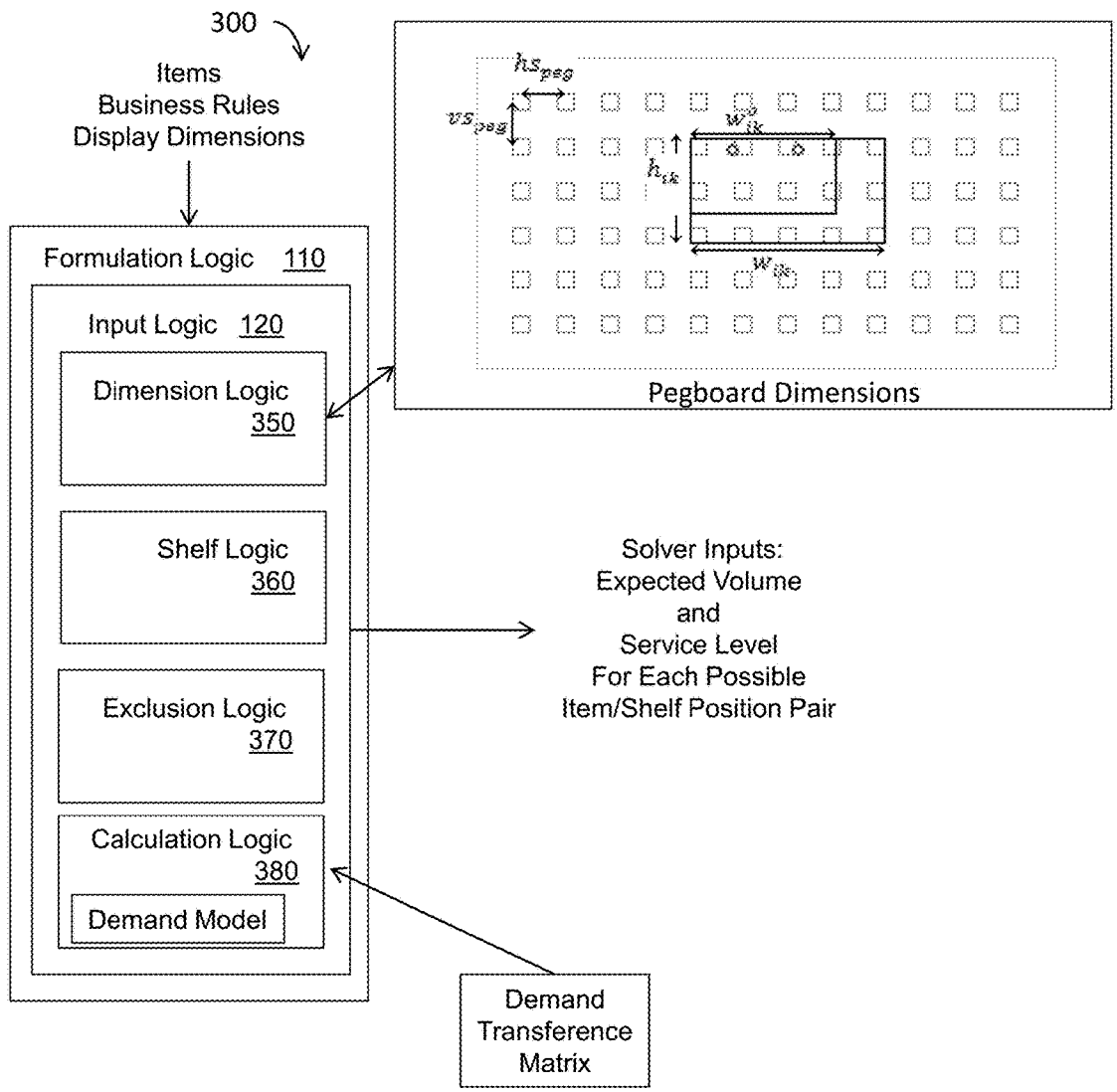
FIG. 3 illustrates one embodiment of the input logic of FIG. 1.

FIG. 3 illustrates a system 300 that includes one embodiment of the formulation logic 110 and the input logic 120. The input logic 120 includes dimension logic 350, shelf logic 360, exclusion logic 370, and calculation logic 380. The input logic 120 reads inputs received by the formulation logic 110. Data describing the item corpus, display space dimensions, item geometry, demand transference and business rules is parsed by the input logic 120.

The dimension logic 350 calculates an effective item width for each item that will be used as the item's dimensions for assortment and shelf space optimization purposes. Finger spacing above and below are used to adjust each item's width. In this manner, the dimension logic 350 uses inter-item spacing and finger spacing to adjust the product width for an item i with k facings, respectively.

In one embodiment, the system 300 is capable of constructing a planogram not only for shelf type displays but also for pegboard displays. Example pegboard dimensions are shown in FIG. 3. For pegboard items, the dimension logic 350 calculates an item's effective height and width by rounding the item's actual height and width up to account for peghole spacing. For example, if the horizontal peghole spacing is $hs_{peg}$ and the actual item width is $w_{ik}^o$ then the item width, for the purposes of the planogram, is calculated as follows:

$$w_{ik} = \left\lceil \frac{w_{ik}^o}{hs_{peg}} \right\rceil * hs_{peg}.$$

If vertical peghole spacing is $vs_{peg}$ and the actual item height is $h_i^o$ then the item's height is calculated by $$h_i = \left\lceil \frac{h_i^o}{vs_{peg}} \right\rceil * vs_{peg}.$$

As can be seen in FIG. 3, an item having dimensions corresponding to the small rectangle in the peghole dimension diagram will be assigned an effective height and width corresponding to the larger rectangle that aligns with the pegholes in the display.

The shelf logic 360 identifies possible shelf positions for each item being considered for the assortment. The shelf logic 360 first accesses the display dimensions to create all possible shelf positions that will be considered for placement of the items. In one embodiment, a user may enable bay merging, which means that adjacent display bays may be merged into a single physical bay. If two bays are merged, an item may be positioned in a shelf position that spans both bays.

If the display is a shelf type fixture, the shelf logic 360 identifies a set of possible shelf positions for each item. The shelf logic 360 determines that a shelf position is available for an item when i) the shelf's elevation is between a minimum and maximum elevation range for the item and ii) the height of the shelf can accommodate a minimum height of the item. The minimum height of the item depends on the item's unit height and how many units will need to be stacked to honor any minimum capacity specified for the item.

If the display is a pegboard type fixture, the shelf logic 360 first calculates the minimum area needed for items that have been designated as mandatory by the user. If there is not enough area, the shelf logic 360 causes the formulation logic 110 to report infeasibility. If there is enough area in the pegboard for all mandatory items, the shelf logic 360 divides the pegboard up into virtual bays and virtual shelves.

Figure 4:
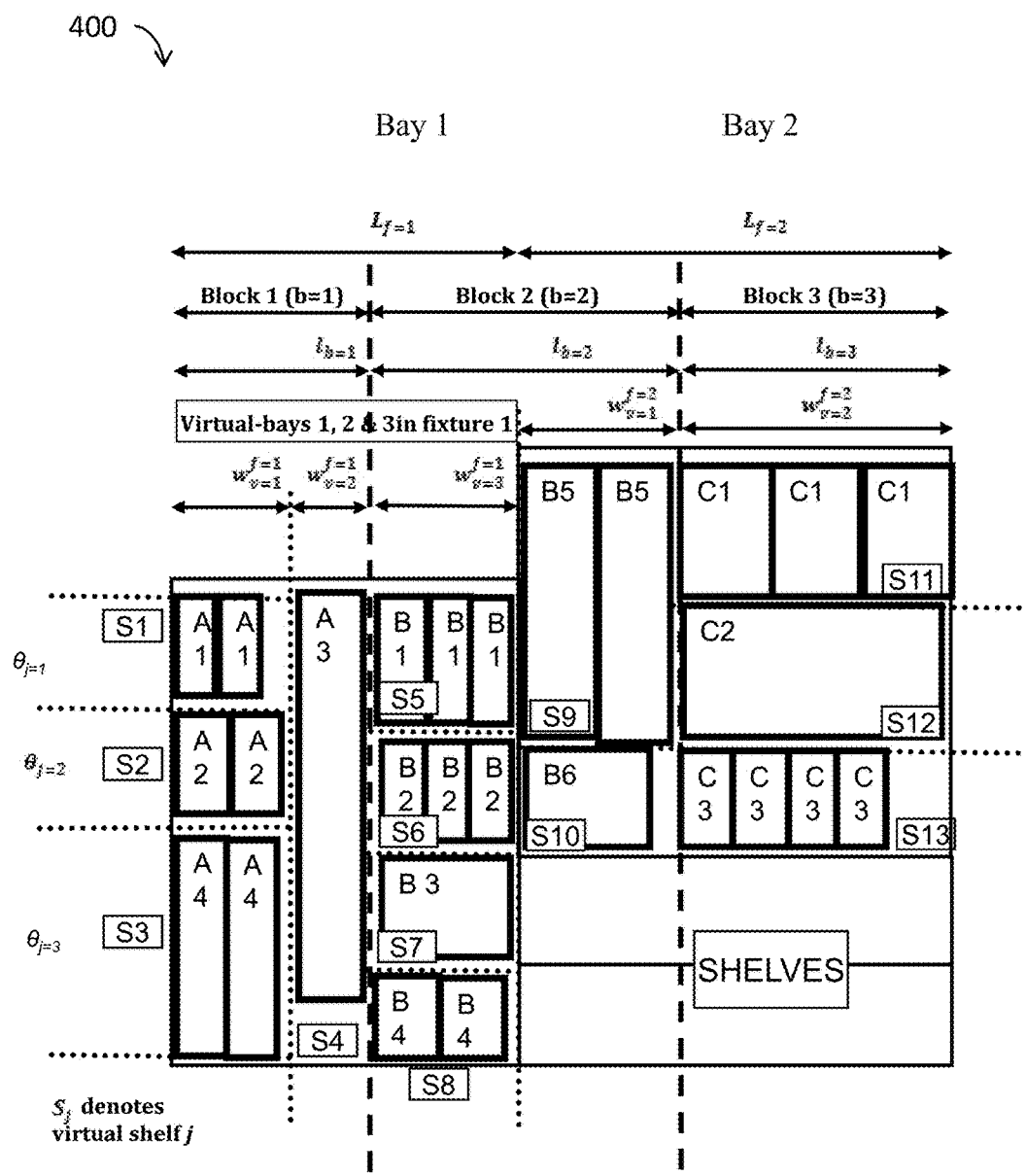
FIG. 4 illustrates how one embodiment of the input logic of FIG. 1 calculates virtual shelves for a pegboard fixture.

Referring now to FIG. 4, a display space 400 having two bays corresponding to two pegboard fixtures is shown divided into 13 virtual shelves S1-S13. For the purposes of illustration, items of brands A, B, and C are also shown on the shelves according to a vertical blocking scheme on brand. If vertical blocking is selected by the user, the shelf logic 360 creates one virtual bay per one vertical block (e.g., virtual bays 1, 2, and 3 in fixture 1). The width of the virtual bays are variable and will be decided by the solver during optimization. The virtual bay is vertically divided into three virtual sub-bays that can each accommodate different shelf structures (e.g, virtual bays 1, 2, and 3 are divided into three virtual sub-bays, denoted $\theta_{j=1}$, $\theta_{j=2}$, and $\theta_{j=3}$). If vertical blocking is not selected by the user, the pegboard is divided into a calculated number of virtual bays corresponding to the width of the pegboard divided by the average item width.

For each virtual sub-bay, the shelf logic 360 creates a calculated number of virtual shelves with adjustable height and width (e.g., virtual bay 3, sub-bay $\theta_{j=3}$ is shown as encompassing two virtual shelves S7 and S8). The total number of virtual shelves is set to be equal to the available pegboard height divided by the average item height. The height and width of the different virtual shelves are determined by the solver during optimization.

Returning to FIG. 3, the exclusion logic 370 provides a means for a user to exclude some items from consideration for the assortment. By interacting with the exclusion logic 370, the user can remove an entire group of related items or remove an item from a match facing group, a same shelf group, and/or a blocking group. The exclusion logic 370 causes the constraint logic 130 (FIG. 1) to adjust constraints as necessitated by the exclusion of certain items.

The exclusion logic 370 performs a feasibility check to determine if the residual set of items meets the constraints. For each item in the group of excluded items, the exclusion logic 370 first determines if the item that was deemed mandatory by the original constraints. If the item is mandatory, the exclusion logic 370 causes the formulation logic 110 to report infeasibility. If the item is not mandatory, the residual set of items is compared against the original constraints. If the residual set of items meets the original constraints, the next excluded item is considered to determine if the item is mandatory, and so on. If the set of excluded items does not cause infeasibility, the exclusion logic 370 removes item and shelf position pairs for the excluded items from the set of item and shelf position pairs that will be considered by the solver. In one embodiment, the excluded items will be designated as excluded when the item and shelf position pairs are provided to the solver.

The calculation logic 380 uses a selected demand model to calculate, for each item and shelf position pair, a predicted sales volume. The predicted sales volume for each item and shelf position pair is one input that is provided by the formulation logic 110 to the solver. In one embodiment, the demand model used by the calculation logic 380 captures two main aspects: i) the effect of the number of facings and ii) the demand transference due to an item that is dropped from consideration for the assortment (e.g., an item that is made part of the exclusion group). The demand model recognizes that there is a trade-off between the lift in sales obtained by increasing the number of facings for an item and the fact that the lift in sales due to one extra facing follows the law of diminishing returns (in a non-linear fashion). The demand model also captures the substitution of demand for an item when a competing item is dropped from the assortment. For example, customers might substitute Coke® when Pepsi® is not in the planogram. If demand for an item in an assortment A that includes the item is expressed as $d_i(f_i,A) = d_i(f_i(0),A) * f_i^{-\gamma}$, the demand model used by the calculation logic 380 is as follows:

$$d_i(f_i,\tilde{A}) = d_i(f_i(0),A) * f_i^{-\gamma} + DT(A - \tilde{A})$$

Where $\tilde{A}$ is an assortment that does not include an item that competes with item i. Thus DT (demand transfer) for i is the contribution by substitution of the item i for a competing item that was dropped from the current assortment.

A demand transference value can be pre-computed for all possible items in an assortment and stored as a demand transfer matrix for use by the calculation logic 380. In one embodiment, the calculation logic 380 pre-computes the demand transfer matrix and the same demand transfer matrix is used each time an item is dropped from the assortment. Each entry in the matrix corresponds to the substitution of demand to each item remaining in the assortment from an item being dropped from the original assortment.

Technically, the true demand transference depends on the current assortment and assuming such a static demand transfer matrix is an approximation. For example, given an initial assortment {1,2,3,4} from which demand transfer values are computed, if in the optimal solution item 4 is dropped, the demand transfer for the other items remaining in the assortment should be re-computed to reflect the removal of item 4. Re-computing of the demand transfer matrix would result in non-linearity and additional complexity. Thus, in the described embodiment, a static demand transfer matrix is used by the calculation logic 380 so that the demand becomes a linear function. In practice, this approximation works quite well because demand transfer effects are small as compared to an item's shelf-contribution to demand. The demand transfer matrix may be computed by the calculation logic 380 and stored for use in calculating the expected sales volumes for item and shelf position pairs.

In one embodiment, the calculation logic 380 also calculates a service level for each item and shelf position pair. Service level is calculated based on the lead time associated with restocking an item, the gross margin of the item, and the demand for the item when it is placed in a given shelf position. As will be described in more detail with respect to FIG. 8, constraints may be provided to the solver that require the item and shelf positions selected for the planogram to provide the minimum service level specified for each item.

Figure 5:
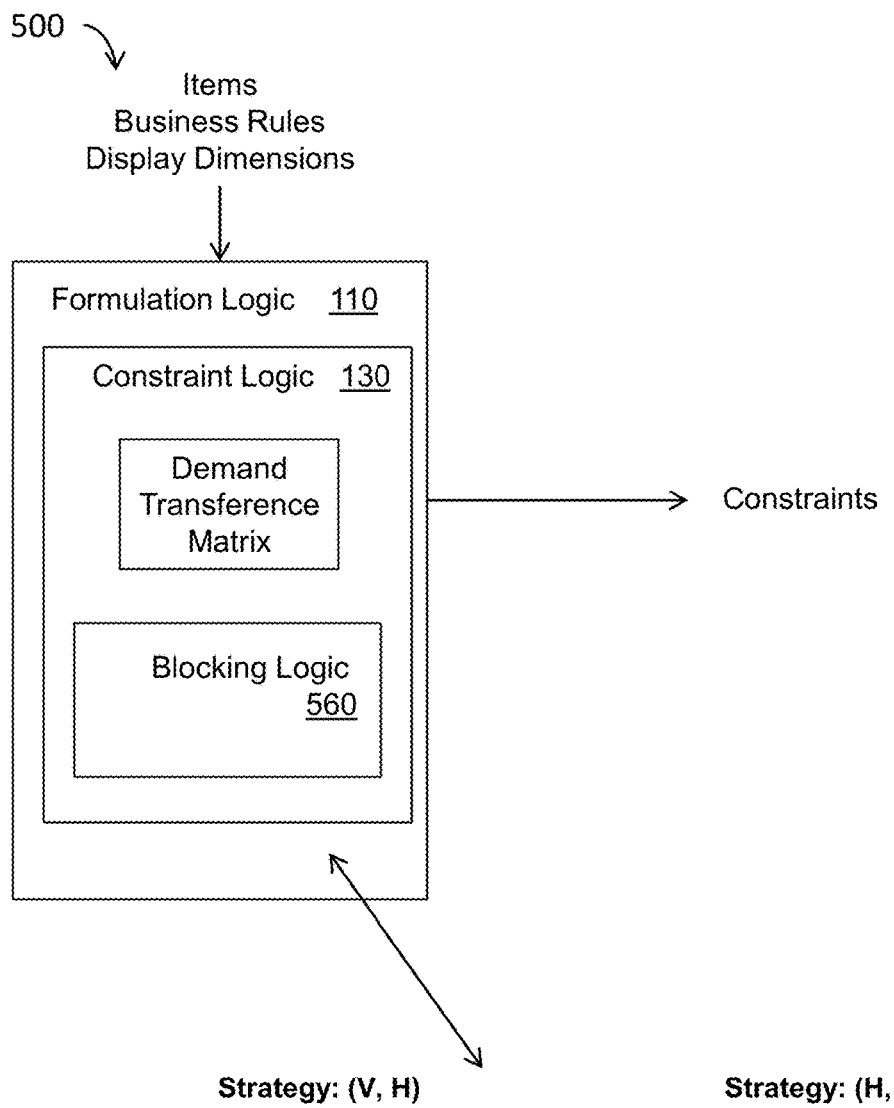
FIG. 5 illustrates one embodiment of the constraint logic of FIG. 1.

FIG. 5 illustrates one embodiment of a system 500 that includes the formulation logic 110 and the constraint logic 130. Recall that the constraint logic 130 selects or generates constraints that embody a retailer's business rules. The constraint logic 130 includes blocking logic 560 that generates constraints that will cause the optimization problem solver to honor a selected blocking strategy. In one embodiment, the blocking logic 560 is configured to determine the attributes on which the retailer wishes to perform blocking and to select one or more stored constraints that embody the retailer's selected blocking strategy. For example, in the formulation described in Appendix A, constraints C13 and C15 are selected by the blocking logic 560 when primary vertical blocking is selected while constraints C14 and C15 are selected by the blocking logic 560 when primary horizontal blocking is selected. FIG. 5 includes a schematic that illustrates how blocks are created in a primarily vertical blocking scheme (Strategy:(V,H)) and also in a primarily horizontal blocking scheme (Strategy:(H,V)).

Figure 6:
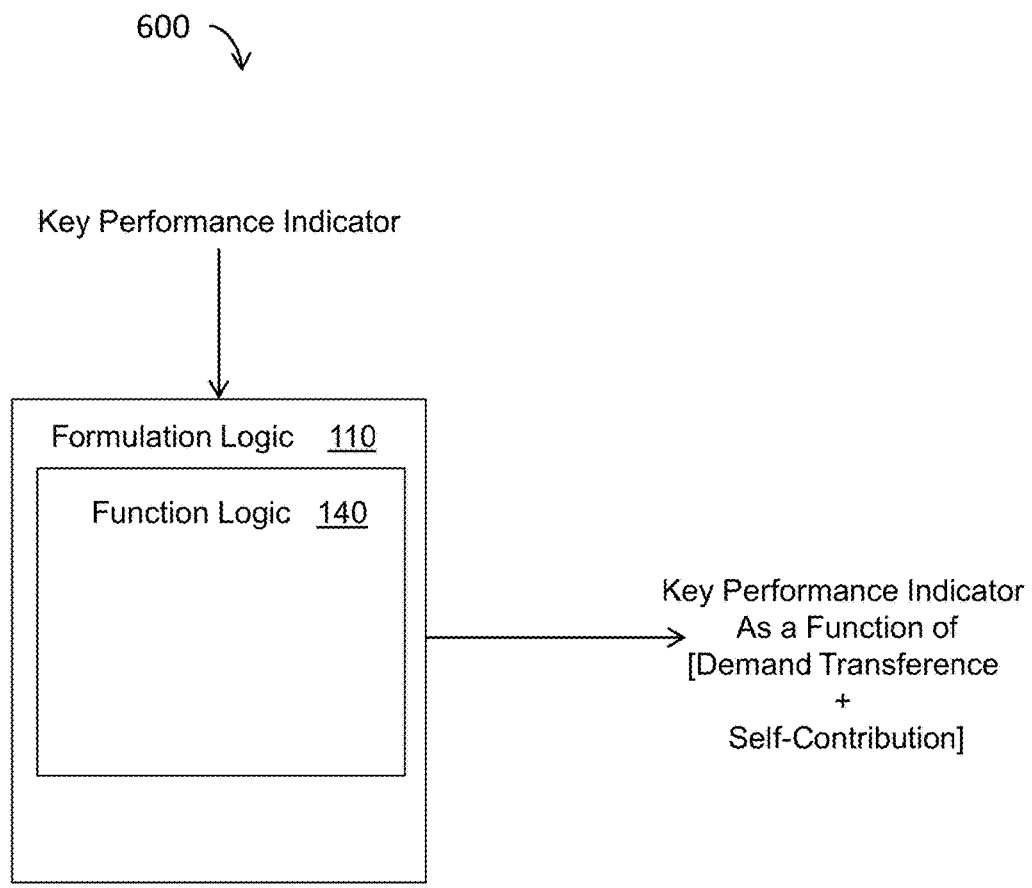
FIG. 6 illustrates one embodiment of the function logic of FIG. 1.

FIG. 6 illustrates one embodiment of a system 600 that includes formulation logic 110 and the function logic 140. The function logic 140 generates an objective function that will be used by the optimization problem solver. To generate the objective function, the function logic 140 combines objective function components mapped to the received key performance indicator. The resulting objective function is stored in a manner that is understandable to the optimization problem solver (e.g., placed in a predetermined memory location that is accessed by the solver). The objective function expresses the selected key performance indicator in terms of expected sales volume or demand. The function logic 140 formulates an objective function that has a first component that captures demand transference due to all items that are not included in the assortment and a second component that captures the shelf contribution to demand for each item in the assortment. Appendix A illustrates four different objective functions for four typical key performance indicators: revenue maximization, sales volume maximization, profit maximization, and minimization of on-hand inventory.

Figure 7:
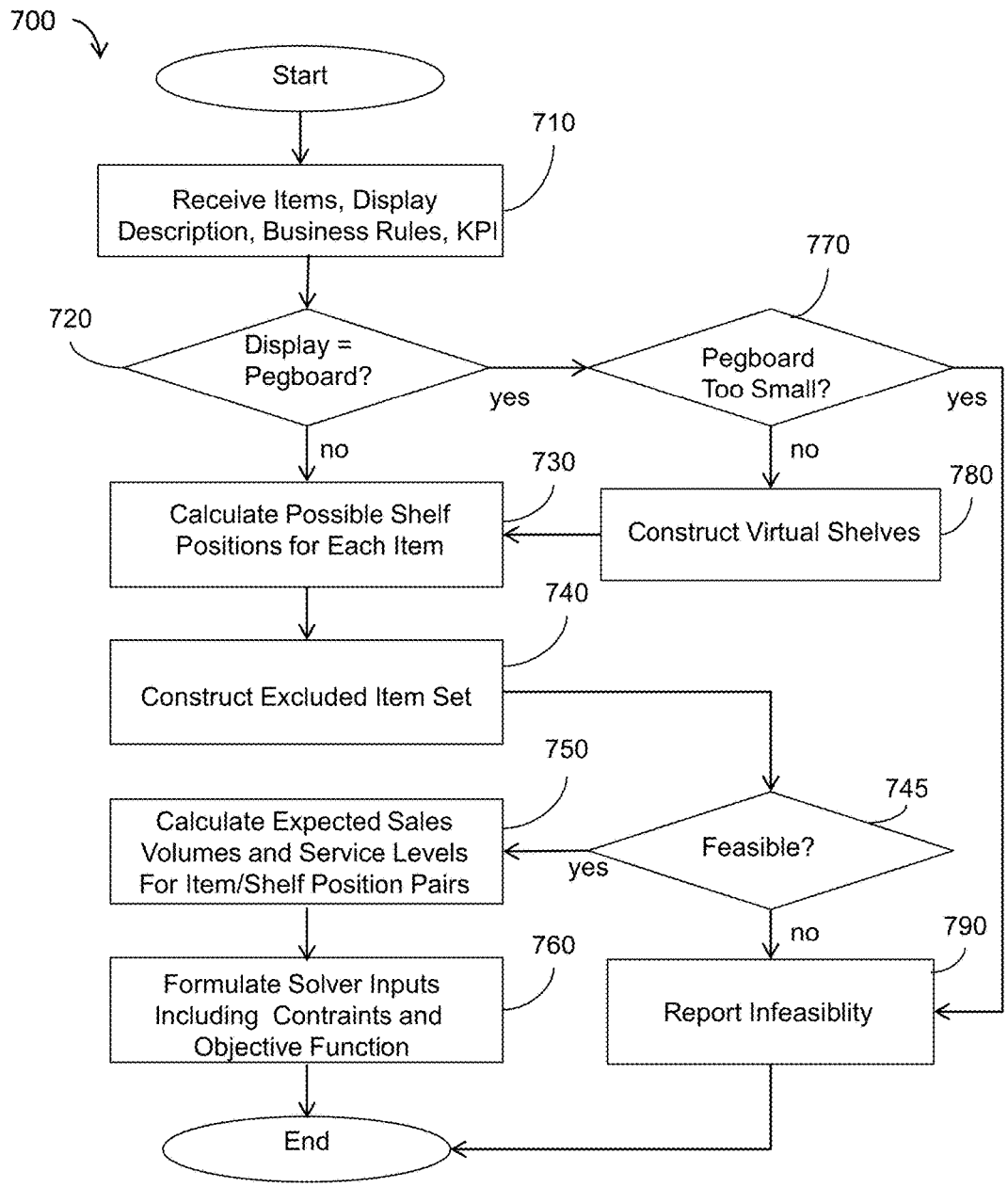
FIG. 7 illustrates one embodiment of a method associated with formulating an optimization problem for input to a solver that optimizes an assortment of items within a display space.

FIG. 7 illustrates one embodiment of a method that pre-processes data received from a retailer to formulate an optimization problem suitable for input to an optimization problem solver. The method 700 may be performed by various embodiments of the formulation logic 110 and its logical sub-components described with reference to FIGS. 1-6 above. At 710, data corresponding to a corpus of items being considered for an assortment, data describing a display space (e.g., dimensions, shelf or pegboard, and so on), data describing business rules, and data specifying a key performance indicator (KPI) are received. At 720, a determination is made as two whether the display is a pegboard or a shelf. If the display is a shelf, at 730 possible shelf positions are identified for each item to produce item and shelf position pairs. Shelf positions that are not suitable for an item (e.g., item is too large, shelf is not in elevation range, and so on as described above) are eliminated in this step to reduce the number of inputs in the formulation produced by the pre-processing method.

If the display is a pegboard, at 770 a determination is made as to whether the pegboard is large enough to accommodate all items that have been deemed mandatory. If the pegboard is too small, the method continues to 790 where infeasibility is reported. In this manner, time and processing can be saved by identifying an improperly sized pegboard and reporting infeasibility at the beginning of the pre-processing method 700. If the pegboard is large enough, at 780 virtual shelves are created in the manner described above with reference to FIGS. 3 and 4. At 730 an item and shelf position pair is created for every item and every virtual shelf. Shelf positions for pegboards are not eliminated in step 730 because the virtual shelves have variable dimensions that will be determined by the solver.

At 740, an excluded item set is constructed as described above with respect to FIG. 1. Recall that a retailer may choose to eliminate certain items from consideration for the assortment. At 745 the excluded item set is analyzed to determine if exclusion of any items in the set will cause violation of any constraint (e.g., a mandatory item is in the exclusion set). If the exclusion set results in a constraint violation, at 790 infeasibility is reported. In this manner, time and processing can be saved by identifying an improper set of items that have been selected by the retailer for consideration for the assortment and ending the pre-processing prior to calculating demand, and optionally service level, for the item and shelf position pairs.

At 745, if the residual set of items (i.e., the original set of items without the exclusion set) meets all constraints, at 750 an expected sales volume is calculated for each item and shelf position pair based on a selected demand function. The shelf positions may be actual shelf positions in a shelf type display or virtual shelves determined at 780. Recall that the demand function takes into consideration the number of facings given to an item as well as the demand transfer to the item from other items that are dropped from the assortment. At 750 the service level for each item and shelf position pair may also be calculated, if service level is to be included as a constraint for the optimization problem solver.

At 760, an optimization problem formulation is produced that includes inputs (e.g., demand and/or service levels for item and shelf position pairs), constraints, and an objective function that expresses a selected key performance indicator in terms of demand. Recall that the objective function that has a first component that captures demand transference due to all items that are not included in the assortment and a second component that captures the shelf contribution to demand for each item in the assortment.

Figure 8:
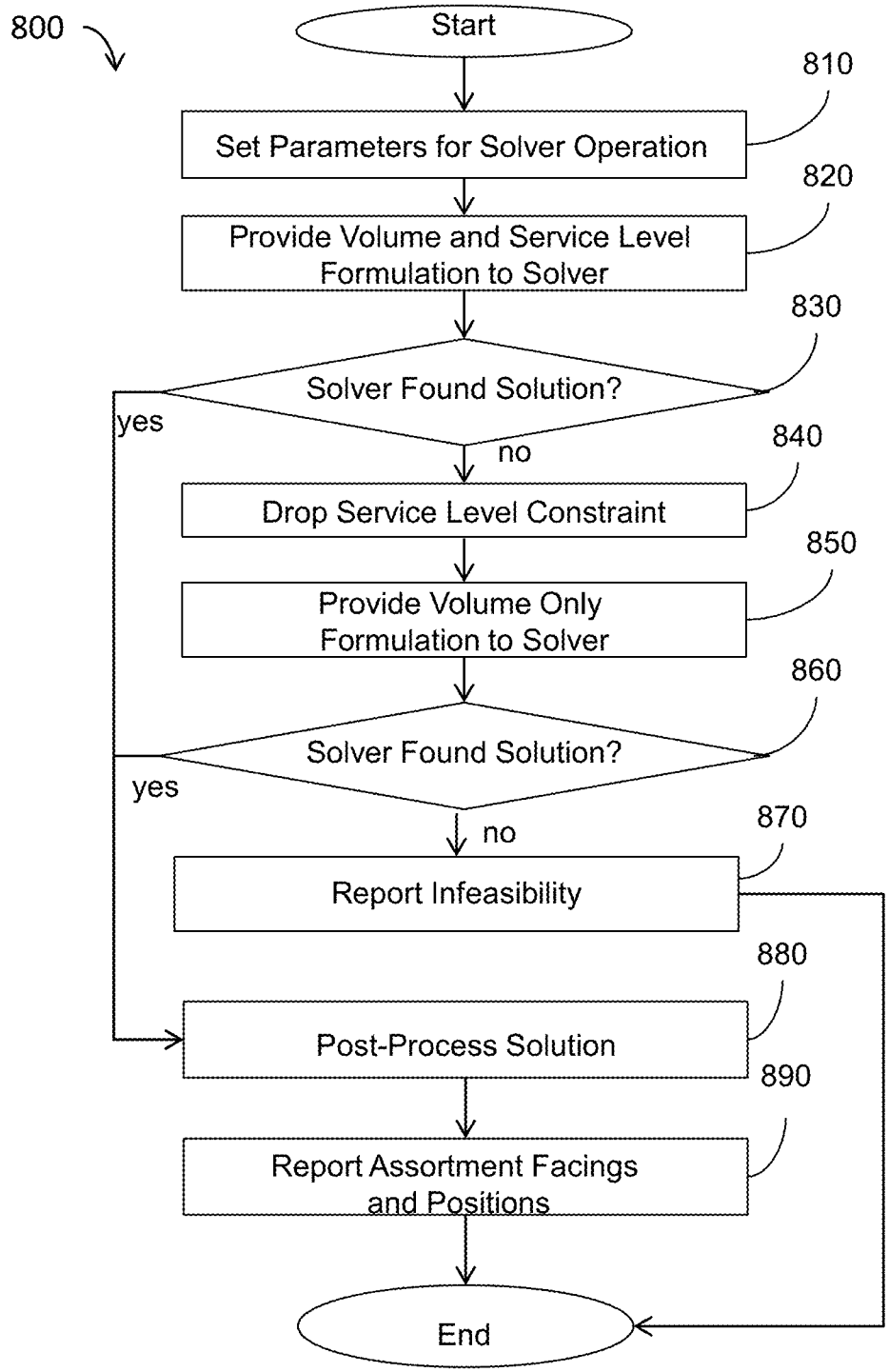
FIG. 8 illustrates an embodiment of a method associated with co-acting with a solver to optimize an assortment of items within a display space.

FIG. 8 illustrates one embodiment of a method 800 that interacts with an optimization problem solver to produce a planogram. The method 800 may be performed by various embodiments of the formulation logic 110 and its logical sub-components described with reference to FIGS. 1-6 above. At 810, parameters for solver operation (e.g., time allowed for computation, and so on) are set. At 820 a volume and service level formulation is provided to the optimization problem solver. The volume and service level formulation includes, as inputs, both expected sales volume for item and shelf position pairs and expected service levels for item and shelf position pairs. The volume and service level formulation also includes constraints that cause the optimization problem solver to impose service levels in the solution. Constraint C11 in Appendix A is a service level constraint that is provided in the example formulation when both volume and service level are in force.

Recall that the formulation provided at 820 also includes constraints that embody a selected blocking strategy. In one embodiment, vertical blocking constraints are only included with shelf type fixtures (not pegboard fixtures). At 830, a determination is made as to whether the optimization problem solver found a solution. If so, at 880 the solution is post processed to produce a planogram. The solution contains the number of facings per item and specifies on which shelf the item is placed. This information is processed to translate to an exact location on the shelf. The objective function is re-calculated by re-applying an original sales/inventory model from the retailer and the original non-linear demand transfer function on the resulting solution. At 890, a planogram that specifies which items are in the assortment as well as a number of facings and shelf (or pegboard) position for each item is reported.

If the optimization problem solver fails to find a solution at 830, at 840 service level constraints are dropped from the previous formulation and at 850 second formulation that includes only expected sales volumes for item and shelf position pairs is provided to the optimization problem solver. If the optimization problem solver is able to find a solution at 860 the solution is post processed to produce a planogram. The solution contains the number of facings per item and specifies on which shelf the item is placed. This information is processed to translate to an exact location on the shelf. The objective function is re-calculated by re-applying an original sales/inventory model from the retailer and the original non-linear demand transfer function on the resulting solution. At 890, a planogram that specifies which items are in the assortment as well as a number of facings and shelf (or pegboard) position for each item is reported. If the optimization problem solver is unable to find a solution at 860, infeasibility is reported at 870.

As can be seen from the foregoing description, the described systems and methods provide an automated solution for creating planograms. The planograms can be optimized according to any number of business rules including blocking strategy. Planograms for both shelf type fixtures and pegboard fixtures can be created automatically. The systems and methods herein determine a formulation appropriate for input to an optimization problem solver. The solution from the optimization problem solver is translated into a planogram that includes the best assortment of items as well as the exact placement of the items.

Computing Device Embodiment

Figure 9:
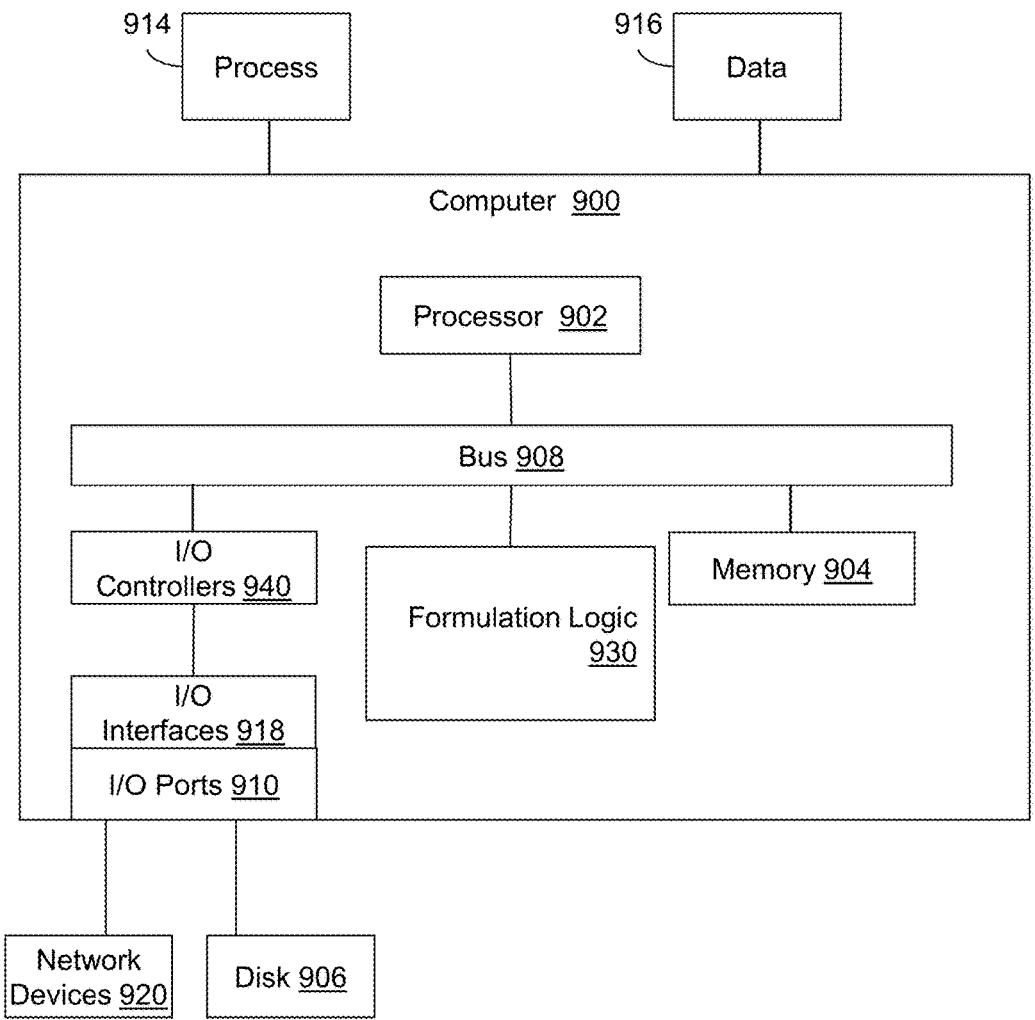
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 may include formulation logic 930 configured to facilitate assortment and shelf space optimization in a manner similar to formulation logic 110 described with reference to FIGS. 1-8. In different examples, the logic 930 may be implemented in hardware, a non-transitory computer-readable medium with stored instructions, firmware, and/or combinations thereof. While the logic 930 is illustrated as a hardware component attached to the bus 908, it is to be appreciated that in other embodiments, the logic 930 could be implemented in the processor 902, stored in memory 904, or stored in disk 906.

In one embodiment, logic 930 or the computer is a means (e.g., structure: hardware, non-transitory computer-readable medium, firmware) for performing the actions described with reference to FIGS. 7 and 8. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to interact with an optimization problem solver to create an optimal planogram. The means may also be implemented as stored computer executable instructions that are presented to computer 900 as data 916 that are temporarily stored in memory 804 and then executed by processor 902.

Logic 930 may also provide means (e.g., hardware, non-transitory computer-readable medium that stores executable instructions, firmware) for performing any or all of the methods described in FIGS. 2, 7, and 8.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the methods of FIGS. 2, 7, and 8. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

Appendix A

EXAMPLE Mixed Integer Linear Programming Formulation

Notation:

| |
|---|
| $I$ = set of all items; |
| $J$ = set of all shelves; |
| $J(i)$ = set of shelves allowed for placing item $i \in I$; |

| |
|---|
| $F$ = set of fixtures (bays) containing the shelves; |
| $LEN_f$ = width of the fixture (bay) $f \in F$; |
| $H_f$ = height of the fixture (bay) $f \in F$; |
| $H_j$ = height of the shelf $j \in J$; (see the figure on next page) |
| $J_f$ = set of the shelves contained in fixture (bay) $f$ |
| $f(j)$ = fixture (bay) index containing shelf $j$ |
| $EL_j$ = elevation of shelf $j$ (see the figure on next page) |
| $J_s^b$ = Starting shelf # for bay $b$ that has shelf $j$ |
| $J_{max} = 2 * \max_j EL_j$ |

| |
|---|
| $M$ = set of mandatory items to be included in the assortment (per AC1) |
| $T$ = set of item groups to be kept together on the same shelf |
| $G$ = set of item groups to be given the same number of facings |
| $A$ = set of all-or-nothing assortment groups (per AC3) |
| $R$ = set of item groups with lower/upper limits on the number of items included in the assortment |
| $\alpha_r, \beta_r$ = lower/upper limits set for assortment group $r \in R$ (per AC2) |

| |
|---|
| $B$ = ordered set of attribute-based vertically blocked and horizontally blocked product groups; |
| $VB$ = ordered set of attribute-based vertically blocked product groups |
| $HB$ = ordered set of attribute-based horizontally blocked product groups |
| $\epsilon_v$ = overlapping tolerance allowed for vertical blocks |
| $\epsilon_h$ = minimum separation between horizontal blocks |

| | |
|---|---|
| $h_i$ = height of item $i$ | |
| $w_{ik}$ = total width taken by $k$ facings of item $i$ | |
| $K_{ij}$ = set of allowed number of facings for item $i$ on shelf $j$ (per LC1); | |
| $f_i^{min}, f_i^{max}$ = Minimum and maximum allowed number of facings for item $i$ (per LC1); | |
| $K^{max}$ = Maximum number of facings possible | |
| $v_{kj}^{is}$ = sales volume for item $i$ when it is placed on shelf $j$ with $k$ facings at store $s$; | |
| $p_i^s$ and $c_i^s$ = price and IPI of item $i$ at store $s$; | |
| $cost_i^s$ = cost of item $i$ at store $s$ | |
| $\mathcal{C}$ = set of stores in the opt-loc (store or a cluster). | |
| $\tau_{ih}^s$ = demand transference matrix for store $s$: fraction of demand increase for product $h$ when product $i$ is taken out of the assortment | |
| $SL_{kj}^{hs}$ = Service level of item $h$ at store $s$: when placed on shelf $j$ with $k$ facings. | |
| $\lambda$ = Damping factor to reduce the DT effect for Space Optimization. $0 \leq \lambda \leq 1$. | |

Variables:

| | |
|---|---|
| Key Decision Variable for Shelf and Facings | $x_{ij}^k = \begin{cases} 1 & \text{if item } i \text{ is placed into shelf } j \text{ with } k \text{ facings } (k \in K_{ij}) \\ 0 & \text{otherwise} \end{cases}$ |
| Assortment Decision | $z_i = \begin{cases} 1 & \text{if item } i \text{ is selected from the assortment} \\ 0 & \text{otherwise} \end{cases}$ |
| Demand Transference | $\delta_i^s$ = revenue (or any other KPI) value contribution to all others in the assortment due to DT when item $i$ at store $s$ is dropped |
| Mandatory Items | $Z_a = 1$ if all items in group $a \in A$ are selected; 0 otherwise |
| Match Facings | $cf_g$ = Number of facings for each item selected in match facings group $g$ |
| Same Shelf | $u_j^t = 1$ if shelf $j$ is used for same shelf group $t$; 0 otherwise<br>$u^t = 1$ if any item from same shelf group $t$ is selected; 0 otherwise |
| Vertical Blocking | $t_v^f = 1$ if vertical block $v$ ends in fixture $f$; 0 otherwise<br>$e_v^f = 1$ if vertical block $v$ exists in (or uses) fixture $f$; 0 otherwise<br>$CT_v$ = fixture number where vertical block $v$ end<br>$l_v^f$ = width of vertical block $v$ in fixture $f$ |

| Horizontal Blocking | $ivh_i^{vh} = 1$ if item $i$ in block $(v,h)$ is selected; 0 otherwise |
|---|---|
| | $j_{min}^{(v,h)}$ = min elevation of horizontal block $h$ in $(v,h)$ |
| | $cj_{min}^{(v,h)}$ = cumulative min elevation of horizontal block $h$ in $(v,h)$ |
| | $j_{max}^{(v,h)}$ = max elevation of horizontal block $h$ in $(v,h)$ |
| | $j_i$ = elevation of item $i$ |
| | Note: $v$ is dropped in superscript and other places when primary blocking strategy is horizontal blocking |

Objective Function:

$C$ is the set of stores in the opt-loc (store or a cluster). The coefficients $\phi_{ij}^k$ are calculated as follows:

$\forall i \in I$ (items), $\forall j \in J(h)$ (shelves), $\forall k \in K_{ij}$ (facings), $$\phi_{kj}^h = \begin{cases} \sum_{s \in C} p_h^s c_h^s v_{kj}^{hs}, & \text{if the objective is revenue maximization} \\ \sum_{s \in C} c_h^s v_{kj}^{hs}, & \text{if the objective is sales volume maximization} \\ \sum_{s \in C} (p_h^s - cost_h^s) c_h^s v_{kj}^{hs}, & \text{if the objective is profit maximization} \\ \sum_{s \in C} \frac{c_h^s v_{kj}^{hs}}{OH_{kj}^{hs}}, & \text{if the objective is minimization of OH inventory} \end{cases}$$

Using the coefficients calculated earlier, the objective function is formulated as follows:

$$\max \sum_{i=1}^{m} \sum_{s \in C} \delta_i^s + \sum_{h=1}^{m} \sum_{j \in J(h)} \sum_{k \in K_{hj}} \phi_{kj}^h x_{kj}^h$$

The first term captures the total demand transference due to dropped item $i$ at store $s$. Actual values of $\delta_i^s$ are calculated using the constraints below (see C12). And the second term in the above equation captures the self-contribution for an item $h$.

Business Rules or Constraints:

C1 requires that mandatory items cannot be excluded from the final assortment.

C1 $\quad z_i = 1 \;\; \forall i \in M$

C2 requires that if one item in a "select subset" is selected for the final assortment, a sufficient number of other items in the "select subset" are also included in the final assortment.

C2 $\quad \alpha_r \leq \sum_{i \in r} z_i \leq \beta_r \;\; \forall r \in R$

C3 requires that if one item in an "all or nothing subset" is selected for the final assortment, all other items in the "all or nothing subset" are also included in the final assortment.

C3 $\quad \sum_i z_i = |a| Y_a \;\; \forall i \in a, a \in A$

C4 requires a unique assignment of items to shelf positions.

C4 $\quad \sum_{j \in J(i)} \sum_{k \in K_{ij}} x_{ij}^k = z_i \;\; \forall i \in I$

C5 enforces a user input minimum and maximum number facings per item.

C5 $\quad f_i^{min} z_i \leq \sum_{j \in J(i)} \sum_{k \in K_{ij}} k \, x_{ij}^k \leq f_i^{max} z_i \;\; \forall i$ C6 enforces a user input minimum capacity for an item.

C6
$$CAP_i^{min} z_i \leq \sum_{j \in J(i)} \sum_{k \in K_{ij}} CAP_i^k x_{ij}^k \; \forall i$$

C8 enforces a user input number of facings for items in the same group g.

C8
$$\forall i \in g: \sum_{j \in J(i)} \sum_{k \in K_{ij}} k x_{ij}^k \leq cf_g + K^{max}(1 - z_i)$$
$$\forall i \in g: \sum_{j \in J(i)} \sum_{k \in K_{ij}} k x_{ij}^k \geq cf_g - K^{max}(1 - z_i)$$

C9 enforces a user input requirement that items from set t must be on the same shelf.

C9
$$\sum_{i \in I(j)} \sum_{k \in K_{ij}} x_{ij}^k \leq |I(j)| u_j^t \; \forall t \in T, \forall i \in t, \forall j \in J$$
$$\sum_{j \in J} u_j^t = u^t \; \forall t \in T$$
$$u^t - z_i \geq 0 \; \forall t \in T, i \in t$$

C10 requires that all facings of an item fit within the shelf the item is assigned to.

C10
$$\sum_{i=1}^{m} \sum_{k \in K_{ij}} w_{ik} x_{ij}^k \leq L_f \; \forall j \in J_f, f \in F$$

C11 requires that each item achieves a user-specified service level. Service levels are calculated in the pre-processing stage and item-shelf-facings combination variables are not selected. The C11 constraint is removed if the linear programming solution cannot find a solution with C11 enforced.

C11 $\quad x_{ij}^k = 0 \text{ for some } i, j, k$

C12 these inequalities ensure that the demand transference is calculated correctly when an item is dropped from the assortment. One of these demand transference constraint sets is selected based on which objective function is in use. A damping factor is added to mitigate the effect of demand transference. Service level adjustment is included to reduce the effect on the receiving item when its service level is low.

C12 $\quad \delta_i^s \geq 0, \forall s \in \mathcal{C}, \forall i \in I$

If objective is revenue maximization then add $$\delta_i^s \leq \sum_{h \in I, h \neq i} \sum_{j \in J(h)} \sum_{k \in K_{hj}} p_h^s c_h^s v_{kj}^{hs} \lambda \tau_{ih}^s SL_{kj}^{hs} x_{kj}^h, \forall s \in \mathcal{C}, \forall i \in I$$

$$\delta_i^s \leq \sum_{h \in I, h \neq i} \sum_{j \in J(h)} \sum_{k \in K_{hj}} p_h^s c_h^s v_{kj}^{hs} \lambda \tau_{ih}^s (1 - z_i), \forall s \in \mathcal{C}, \forall i \in I$$

If objective is sales volume maximization, then add $$\delta_i^s \leq \sum_{h \in I, h \neq i} \sum_{j \in J(h)} \sum_{k \in K_{hj}} c_h^s v_{kj}^{hs} \lambda \tau_{ih}^s SL_{kj}^{hs} x_{kj}^h, \forall s \in \mathcal{C}, \forall i \in I$$

$$\delta_i^s \leq \sum_{h \in I, h \neq i} \sum_{j \in J(h)} \sum_{k \in K_{hj}} c_h^s v_{kj}^{hs} \lambda \tau_{ih}^s SL_{kj}^{hs} (1 - z_i), \forall s \in \mathcal{C}, \forall i \in I$$

If objective is profit maximization, then add $$\delta_i^s \leq \sum_{h \in I, h \neq i} \sum_{j \in J(h)} \sum_{k \in K_{hj}} (p_h^s - cost_h^s) c_h^s v_{kj}^{hs} \lambda \tau_{ih}^s SL_{kj}^{hs} x_{kj}^h, \forall s \in \mathcal{C}, \forall i \in I$$

$$\delta_i^s \leq \sum_{h \in I, h \neq i} \sum_{j \in J(h)} \sum_{k \in K_{hj}} (p_h^s - cost_h^s) c_h^s v_{kj}^{hs} \lambda \tau_{ih}^s SL_{kj}^{hs} (1 - z_i), \forall s \in \mathcal{C}, \forall i \in I$$

If objective is minimization of OH inventory, then add $$\delta_i^s \leq \sum_{h \in I, h \neq i} \sum_{j \in J(h)} \sum_{k \in K_{hj}} \frac{v_{kj}^{hs} \lambda \tau_{ih}^s SL_{kj}^{hs} x_{kj}^h}{OH_{kj}^{hs}}, \forall s \in \mathcal{C}, \forall i \in I$$

$$\delta_i^s \leq \sum_{h \in I, h \neq i} \sum_{j \in J(h)} \sum_{k \in K_{hj}} \frac{v_{kj}^{hs} \lambda \tau_{ih}^s SL_{kj}^{hs}(1 - z_i)}{OH_{hj}^{ks}}, \forall s \in \mathcal{C}, \forall i \in I$$

C13 ensures that secondary horizontal blocking for shelf type displays is respected. Either C13 OR C14 are enforced for shelf type displays, but not both.

C13

$$\forall i \in I: \sum_{j \in I(j)} \sum_{k \in K_{ij}} EL_j x_{ij}^k = j_i$$

$\forall i \in (v, h) \in B:$
$j_{min}^{(v,h)} \leq j_i + J_{max}(1 - ivh_i^{vh}); \ j_{min}^{(v,h)} \geq j_i - J_{max}(1 - ivh_i^{vh})$ $\forall i \in (v, h) \in B: \sum_{i \in (v,h)} ivh_i^{vh} \geq z_i; \ ivh_i^{vh} \leq z_i$ $\forall (v, h) \in B: \sum_{i \in (v,h)} ivh_i^{vh} \leq 1$ $\forall i \in (v, h) \in B: j_i \leq j_{max}^{(v,h)}; \ j_i \geq j_{min}^{(v,h)} - J_{max}(1 - z_i)$ $\forall i \in (v, h) \in B: \forall (v, h) \in B:$ $$cj_{min}^{(v,h)} \leq j_{min}^{(v,h)} + J_{max}\left(1 - \sum_{i \in (v,h)} ivh_i^{vh}\right)$$

$$cj_{min}^{(v,h)} \geq j_{min}^{(v,h)} - J_{max}\left(1 - \sum_{i \in (v,h)} ivh_i^{vh}\right)$$

$\forall (v, h) \in B, h \leq |HB(v)| - 1:$
$cj_{min}^{(v,h)} \geq j_{max}^{(v,h+1)} + \epsilon_h \sum_{i \in (v,h+1)} ivh_i^{(v,h+1)}; \ cj_{min}^{(v,h)} \geq cj_{min}^{(v,h+1)}$ C14 ensures that primary horizontal blocking for shelf type displays is respected. Either C13 OR C14 are enforced for shelf type displays, but not both.

C14

$$\forall i \in I: \sum_{j \in I(j)} \sum_{k \in K_{ij}} EL_j x_{ij}^k = j_i$$

$\forall i \in h \in HB:$
$$j_{min}^h \leq j_i + J_{max}(1 - ih_i^h) \; ; \; j_{min}^h \geq j_i - J_{max}(1 - ih_i^h)$$

$\forall i \in h \in HB:$
$$\sum_{i \in h} ih_i^h \geq z_i \; ; \; ih_i^h \leq z_i$$

$\forall h \in HB:$
$$\sum_{i \in h} ih_i^h \leq 1$$

$\forall i \in h \in HB: \; j_i \leq j_{max}^h \; ; \; j_i \geq j_{min}^h - J_{max}(1 - z_i)$ $\forall h \in HB:$ $$cj_{min}^h \leq j_{min}^h + J_{max}\left(1 - \sum_{i \in h} ih_i^h\right)$$

$$cj_{min}^h \geq j_{min}^h - J_{max}\left(1 - \sum_{i \in h} ih_i^h\right)$$

$\forall h \leq |HB| - 1:$
$$cj_{min}^h \geq j_{max}^{h+1} + \epsilon_h \Sigma_{i \in (h+1)} ih_i^{h+1} \; ; \; cj_{min}^h \geq cj_{min}^{h+1}$$

C15 ensures that either primary or secondary vertical blocking for shelf type displays is respected. The inequalities ensure that the width of the blocks is calculated correctly, with some tolerance and ensure proper sequencing of the blocks.

C15

$$\forall v \in VB, f \in F, \forall j \in J_f, : \sum_{i \in v} \sum_{k \in K_{ij}} w_{ik} x_{ij}^k \leq l_v^f + \epsilon_v$$

$$\forall f \in F: \sum_{v \in VB} l_v^f \leq LEN_f$$

$$\forall v \in VB, f \in F: l_v^f \leq LEN_f e_v^f$$

$$\forall v \in VB, f \in F: e_v^f \leq \sum_{i \in v} \sum_{j \in J_f} \sum_k x_{ij}^k$$

$$\forall v \in VB: \sum_{f \in F} t_v^f \leq 1$$

$$\forall v \in VB: \sum_{f \in F} t_v^f \geq e_v^f$$

$$\forall v \in VB: t_v^f \leq e_v^f$$

$$\forall v \in VB = \{0, \ldots |VB| - 2\}, f \in F = \{0, \ldots, |F| - 1\}:$$

$$CT_v \geq \sum_f (f+1) t_v^f$$

$$CT_v \leq \sum_f (f+1) t_v^f + (|F|+1)\left(1 - \sum_{f \in F} t_v^f\right)$$

$$CT_{v+1} \geq CT_v$$

$$(f+1) e_v^f \leq CT_v$$

$$(|F|+1)(1 - e_{v+1}^f) + (f+1) e_{v+1}^f \geq CT_v$$

C16 ensures that the total height of shelves in a sub-bay of the fixture do not exceed the height of the fixture.

C16

$$h_i \sum_{k \in K_{ij}} x_{ij}^k \leq \theta_j \; \forall i \in b, b \in B, \forall j \in J_v, v \in S_f, f \in F$$

$$\sum_{j \in J_s} \theta_j \leq H_f \; \forall s \in S_f, f \in F$$

What is claimed is:

1. A non-transitory computer storage medium storing computer-executable instructions that when executed by a computer cause the computer to construct a planogram by:
receiving, by at least one processor, data describing i) a set of items selected from a corpus of items, where each item is described by item dimensions, ii) a display space; iii) business rules that constrain the selection and positioning of items in the display space, and iv) a key performance indicator;
identifying, by at least the processor, a set of available shelf positions in the display space for each item in the set based, at least in part, on the item dimensions;
calculating for each item and available shelf position pair, by at least the processor, i) an expected sales volume and ii) an expected service level based, at least in part, on a selected demand model,
wherein the expected service level corresponds to a probability that the item will be in stock in the display space,
wherein each item and available shelf position pair corresponds to a combination of an item and an available shelf position;
providing, by at least the processor, a set of inputs to an optimization problem solver including i) the expected sales volume for the item and available shelf position pairs, ii) a set of constraints that embodies the business rules, iii) an objective function that expresses the key performance indicator as a function of the expected sales volumes and iv) the expected service level for the item and available shelf position pairs,
wherein the optimization problem solver:
processes the set of inputs to determine one or more solutions with the expected service level where a solution specifies i) an assortment of the items selected from the set of items and ii) for each item in the assortment, an optimal shelf position;
in response to failing to compute the one or more solutions with the expected service level, the optimization problem solver:
(i) drops the expected service level; and
(ii) computes, based upon the key performance indicator and without using the expected service level, another solution that specifies i) the assortment of the items selected from the set of items and ii) for each item in the assortment, the optimal shelf position; and
generating, by at least the processor, a planogram that specifies the assortment of items and respective optimal shelf positions of the items, wherein the planogram is representative of a physical arrangement of the items on physical shelves in a store.

2. The non-transitory computer storage medium of claim 1, where the selected demand model predicts the expected sales volume for each item and shelf position pair based on i) a quantity of item facings produced by positioning the item in the shelf position and ii) a demand transference from items in the corpus that are not included in the set of items.

3. The non-transitory computer storage medium of claim 1, where the objective function includes a first component that characterizes demand transference from items in the set of items not selected for the assortment to items selected for the assortment and a second component that characterizes a shelf contribution to demand for items in the set.

4. The non-transitory computer storage medium of claim 1, where the instructions further cause the computer to construct the planogram by:
determining that the display space comprises a pegboard having pegholes evenly arranged according to a horizontal peg spacing and a vertical peg spacing;
calculating the item dimensions for each item by, for each item:
rounding an actual item width up to a next integer value of horizontal peg spacing;
rounding an actual item height up to a next integer value of vertical peg spacing; and
determining shelf positions that correspond to blocks of pegholes by dividing the pegboard into a plurality of virtual shelves having respective dimensions determined based on a relationship between average item dimensions and dimensions of the pegboard; and
where the instructions for calculating an expected sales volume for each item and available shelf position pair based on a selected demand model include instructions for calculating an expected sales volume for each item and virtual shelf pair.

5. The non-transitory computer storage medium of claim 1, where the instructions further cause the computer to construct the planogram by:
prior to identifying a set of available shelf positions in the display space for each item in the set:
determining if the set of items violates any of the business rules; and
when the set of items violates a business rule, reporting infeasibility to a computing device without identifying a set of available shelf positions.

6. The non-transitory computer storage medium of claim 1, where the instructions further cause the computer to construct the planogram by:
reporting infeasibility to a computing device when the optimization problem solver fails to find the one or more solutions.

7. A computing system comprising:
at least one processor connected to at least one memory; and
a non-transitory computer readable medium with stored instructions that are configured as a set of logics executable by at least the processor, the logics comprising:
input logic configured to:
receive, by at least the processor, data describing i) a set of items selected from a corpus of items, where each item is described by item dimensions, ii) a display space; iii) business rules as a set of constraints that constrain the selection and positioning of items in the display space, and iv) a key performance indicator;
identify, by at least the processor, a set of available shelf positions in the display space for each item in the set based, at least in part, on the item dimensions; and
calculate for each item and available shelf position pair, by at least the processor, i) an expected sales volume and ii) an expected service level based, at least in part, on a selected demand model;
wherein the expected service level corresponds to a probability that the item will be in stock in the display space,
wherein each item and available shelf position pair corresponds to a combination of an item and an available shelf position;
constraint logic configured to generate, by at least the processor, the set of constraints that embodies the business rules;

function logic configured to generate, by at least the processor, an objective function that expresses the key performance indicator as a function of the expected sales volumes; and formulation logic configured to:
provide as a set of inputs, by at least the processor and to an optimization problem solver executed by at least the processor,
i) the expected sales volume for the item and available shelf position pairs,
ii) the set of constraints, iii) the objective function and iv) the expected service level for the item and available shelf position pairs;
wherein the optimization problem solver:
processes the set of inputs to determine one or more solutions with the expected service level where a solution specifies i) an assortment of the items selected from the set of items and ii) for each item in the assortment, an optimal shelf position;
in response to failing to compute the one or more solutions with the expected service level, the optimization problem solver:
(i) drops the expected service level; and
(ii) computes, based upon the key performance indicator and without using the expected service level, another solution that specifies i) the assortment of the items selected from the set of items and ii) for each item in the assortment, the optimal shelf position; and
wherein the formulation logic is further configured to:
generate, by at least the processor, a planogram that specifies the assortment of items and respective optimal shelf positions of the items, wherein the planogram is representative of a physical arrangement of the items on physical shelves in a store.

8. The computing system of claim 7, where the selected demand model predicts the expected sales volume for each item and shelf position pair based on i) a quantity of item facings produced by positioning the item in the shelf position and ii) a demand transference from items in the corpus that are not included in the set of items.

9. The computing system of claim 7, where the objective function includes a first component that characterizes demand transference from items in the set of items not selected for the assortment to items selected for the assortment and a second component that characterizes a shelf contribution to demand for items in the set.

10. The computing system of claim 7, where the business rules include a selected blocking strategy that defines whether related items are positioned in a horizontal blocks or vertical blocks within the display space.

11. The computing system of claim 7, where the input logic is further configured to determine that the display space comprises a pegboard having pegholes evenly arranged according to a horizontal peg spacing and a vertical peg spacing, the computing system further comprising:
dimension logic configured to calculate the item dimensions for each item by, for each item:
rounding an actual item width up to a next integer value of horizontal peg spacing; and
rounding an actual item height up to a next integer value of vertical peg spacing; and
shelf logic configured to determine shelf positions that correspond to blocks of pegholes by dividing the pegboard into a plurality of virtual shelves having respective dimensions determined based on a relationship between average item dimensions and dimensions of the pegboard; and
where the input logic is configured to calculate an expected sales volume for each item and shelf position pair based on a selected demand model
include instructions for calculating an expected sales volume for each item and virtual shelf pair.

12. The computing system of claim 7, where the input logic is further configured to:
report infeasibility to a computing device when the optimization problem solver fails to find a solution.

13. A computer-implemented method, comprising: receiving, by at least one processor, data describing i) a set of items selected from a corpus of items, where each item is described by item dimensions, ii) display space dimensions; iii) business rules that constrain the selection and positioning of items in the display space, and iv) a key performance indicator;
identifying, by at least the processor, a set of possible shelf positions in the display space for each item in the set based, at least in part, on the item dimensions;
calculating for each item and shelf position pair, by at least the processor, i) an expected sales volume and ii) an expected service level based, at least in part, on a selected demand model,
wherein the expected service level corresponds to a probability that at least one of the item will be available on a shelf,
wherein each item and available shelf position pair corresponds to a combination of an item and an available shelf position;
providing, by at least the processor, a set of inputs to an optimization problem solver including i) the expected sales volume for the item and shelf position pairs, ii) a set of constraints that embodies the business rules, iii) an objective function that expresses the key performance indicator as a function of the expected sales volumes and iv) the expected service level for the item and available shelf position pairs,
wherein the optimization problem solver:
processes the set of inputs to determine one or more solutions with the expected service level where a solution specifies i) an assortment of the items selected from the set of items and ii) for each item in the assortment, an optimal shelf position;
in response to failing to compute the one or more solutions with the expected service level, the optimization problem solver:
(i) drops the expected service level; and
i) computes, based upon the key performance indicator and without using the expected service level, another solution that specifies the assortment of the items selected from the set of items and ii) for each item in the assortment, the optimal shelf position; and
generating, by at least the processor, a planogram that specifies the assortment of items and respective optimal shelf positions of the items as computed by the optimization problem solver, wherein the planogram is representative of a physical arrangement of the items on physical shelves in a store.

14. The computer-implemented method of claim 13, where the selected demand model predicts the expected sales volume for each item and shelf position pair based on i) a quantity of item facings produced by positioning the item in the shelf position and ii) a demand transference from items in the corpus that are not included in the set of items.

15. The computer-implemented method of claim 13, where the objective function includes a first component that characterizes demand transference from items in the set of items not selected for the assortment to items selected for the assortment and a second component that characterizes a shelf contribution to demand for items in the set.

16. The computer-implemented method of claim 13, where the business rules include a selected blocking strategy that defines whether related items are positioned in a horizontal blocks or vertical blocks within the display space.

17. The computer-implemented method of claim 13, further comprising:
   determining that the display space comprises a pegboard having pegholes evenly arranged according to a horizontal peg spacing and a vertical peg spacing;
   calculating the item dimensions for each item by, for each item:
      rounding an actual item width up to a next integer value of horizontal peg spacing; and
      rounding an actual item height up to a next integer value of vertical peg spacing; and
   determining shelf positions that correspond to blocks of pegholes by dividing the pegboard into a plurality of virtual shelves having respective dimensions determined based on a relationship between average item dimensions and dimensions of the pegboard; and
   where calculating an expected sales volume for each item and shelf position pair based on a selected demand model comprises calculating an expected sales volume for each item and virtual shelf pair.

18. The computer-implemented method of claim 13, further comprising, prior to identifying a set of possible shelf positions in the display space for each item in the set:
   determining if the set of items violates any of the business rules; and
   when the set of items violates a business rule, reporting infeasibility to a computing device without identifying a set of possible shelf positions.

19. The computer-implemented method of claim 13, further comprising:
   reporting infeasibility to a computing device when the optimization problem solver fails to find the one or more solutions.

* * * * *